United States Patent [19]
Engel et al.

[11] Patent Number: 5,726,577
[45] Date of Patent: Mar. 10, 1998

[54] APPARATUS FOR DETECTING AND RESPONDING TO SERIES ARCS IN AC ELECTRICAL SYSTEMS

[75] Inventors: Joseph C. Engel, Monroeville; Raymond W. Mackenzie, Baldwin Boro, both of Pa.

[73] Assignee: Eaton Corporation, Cleveland, Ohio

[21] Appl. No.: 633,603

[22] Filed: Apr. 17, 1996

[51] Int. Cl.⁶ ..................... G01R 31/12
[52] U.S. Cl. ........... 324/536; 324/520; 324/557; 324/535
[58] Field of Search .................. 324/521, 520, 324/557, 536, 535

[56] References Cited

U.S. PATENT DOCUMENTS

| | | |
|---|---|---|
| 3,515,943 | 6/1970 | Van Cortlandt . |
| 4,376,243 | 3/1983 | Renn et al. . |
| 4,949,214 | 8/1990 | Spencer . |
| 5,121,282 | 6/1992 | White . |
| 5,185,687 | 2/1993 | Beihoff .................. 361/45 |
| 5,208,542 | 5/1993 | Tennies .................. 324/536 |
| 5,223,795 | 6/1993 | Blades . |
| 5,224,006 | 6/1993 | Mackenzie et al. . |
| 5,307,230 | 4/1994 | Mackenzie . |
| 5,477,150 | 12/1995 | Ham ................... 324/76.23 |
| 5,561,605 | 10/1996 | Zuercher .................. 324/536 |

FOREIGN PATENT DOCUMENTS 1210847  9/1986  Canada .

*Primary Examiner*—Vinh P. Nguyen
*Assistant Examiner*—Jose M. Solis
*Attorney, Agent, or Firm*—Martin J. Moran

[57] ABSTRACT

Series arcs in an ac circuit are discriminated from other phenomenon by analyzing the timing between pulses in a second derivative of the current signal. A first timer starts timing upon detection of a first pulse in the second derivative of current signal. Time out of the first timer starts a second timer which times a second interval or window during which a series arcing fault will generate a second pulse of opposite polarity to the first pulse. Detection of the first pulse followed by a second pulse of opposite polarity during the window sets a flip-flop to record the event. When a predetermined number of events are counted by a counter within a given time-period set by a third timer, an output signal indicating an arcing fault is generated. If the second pulse is generated before the window opens, or a third pulse occurs during the window, the flip-flop cannot be set so that other events such as the switching of a dimmer do not generate a false output signal.

19 Claims, 5 Drawing Sheets

APPARATUS FOR DETECTING AND RESPONDING TO SERIES ARCS IN AC ELECTRICAL SYSTEMS

BACKGROUND OF THE INVENTION

1. Field of the Invention

This invention relates to detection and interruption of series arcs in an ac electrical system.

2. Background Information

Arcing faults in ac electrical systems are of two types: parallel arcs and series arcs. Parallel arcing faults are line-to-line faults or line-to-ground faults which can occur, for instance, when the insulation on the conductors becomes frayed or is penetrated. Such parallel arcing faults can draw considerable current but usually below the pick-up current or the typical circuit breaker. They also tend to be intermittent because the repulsion forces generated by the current of the arc tends to temporarily separate the conductors and extinguish the arc. Thus, parallel arcs are often referred to as sputtering arcs.

Series arcing faults on the other hand occur in a single conductor path, such as for instance, where a conductor has been cut or at a loose or poor connection. The current in a series arc depends upon the load, but can be in the milliamp range. Previously disclosed methods and apparatus of detecting line-to-line or line-to-ground arcs have proven successful. However, lower level arcs in series with a load may be beyond the capabilities of those techniques. There are two obstacles to merely increasing the sensitivity of prior techniques. At increased sensitivities, there may be more loads and combinations of loads that can produce false trips. Additionally, at lower currents, the current waveform differs from that produced at higher currents, primarily because as the current level will be too low to blow the arc apart, the current will be more continuous, except for discontinuities at current zero crossings. Previous attempts to detect series arcs have primarily focused on analyzing the high frequency content of the arc current. Such techniques typically involve analyzing various figures of merit of this high frequency content. There are several problems with this approach. First, numerous loads, such as for instance computers, have capacitive filters on their inputs while others such as motors or audio equipment with transformer inputs present an inductive impedance to the electrical system. Such loads filter out the high frequency content of the arc current. Furthermore, many of these arc detectors which analyze the high frequency content of the arc current require a microprocessor which increases the cost prohibitively for wide spread use.

There is a need therefore, for an improved apparatus and method for detecting series arcing faults.

There is a further need for such an improved apparatus and method for detecting series arcing faults which can be used in ac circuits powering any of the common types of loads, including loads with capacitive filter inputs, transformers and motor loads.

There is a further need for such series arc detection which can detect such arcs anywhere in the protected circuit portion.

There is an additional need for such series arcing fault detection which operates over a wide dynamic range of fault currents.

There is also a need for providing such an improved apparatus and a method for detecting arcing faults which is economical for wide spread use.

SUMMARY OF THE INVENTION

These needs and others are satisfied by the invention which is based upon the discovery that a series arc generates a recognizable, predictable distortion of the ac current. During each half cycle as the voltage falls below the arc voltage, the current will fall to zero and will remain at zero until the voltage again arises above the arc voltage on the next half cycle. As the arc voltage typically remains constant, the discontinuities in the ac waveform will be repeated regularly at each zero crossing. These discontinuities produce pulses in the second derivative of the current which are of opposite polarity. The sequence of the polarity of the pulses is reversed for zero crossings in the two directions. The two pulses at each zero crossing will be separated in time by the length of the zero crossing discontinuity. This time is a function of the arc voltage, line voltage and line frequency, but is not a linear function of current level. Thus, the technique can be used to detect arcing faults over a wide range of current amplitude.

In accordance with the invention, sensing means are provided to sense the current in the ac circuit and generate a second derivative signal representative of the second derivative of the current. As discussed above, this signal will have pairs of pulses of opposite polarity spaced in time. Thus, means are provided to generate an output signal based upon the timing between pulses of the second derivative signal. More particularly, an output signal indicative of an arcing fault is generated if a second pulse appears in the second derivative of current signal within an interval of predetermined duration commencing a predetermined time after the first pulse and is of opposite polarity to the first pulse.

There are two known loads which may mimic the series arc waveform to some extent. These are a lamp dimmer and a power supply using a full-wave rectifier and a capacitor input filter, as may be used in a television receiver, for example. The power supply can be expected to have a longer discontinuity than a series arc, except for a very short time-period at the turn on of the power supply. Therefore, in accordance with the preferred embodiment of the invention, means are provided to generate an output signal indicative of an arc only when the pattern of a pair of arcs of opposite polarity with the prescribed timing between pulses occurs repeatedly.

The second derivative signal of the current generated by a lamp dimmer has a triple pulse of alternating polarities at each zero crossing. The spacing of the first and second pulses is a function of the dimmer setting, and may, therefore, be within the timing range expected for the series arc. However, the second and third pulses will always be very close together. Therefore, the apparatus in accordance with the invention, includes means which prevent generation of an output signal indicative of an arc if a third pulse follows the second pulse within the interval of predetermined duration. In addition, an additional pulse occurring after the first pulse but before the interval also blocks generation of an output signal.

The invention can include means which detect the polarity sequence of zero crossings in only one direction, or of zero crossings in both directions. In the later case, means can be provided which generate a final output signal only if output signals are generated by means responsive to zero crossings in both directions.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1A:
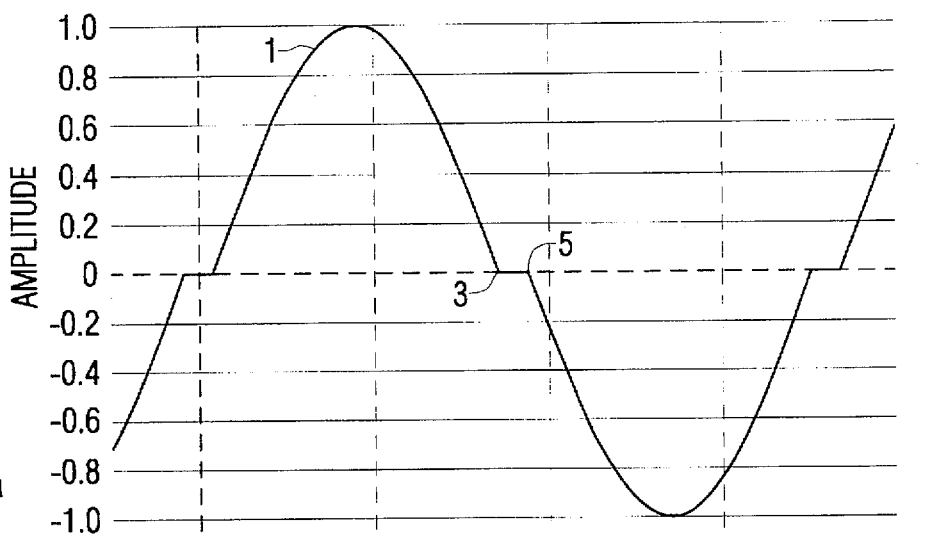
FIGS. 1A, B and C illustrate current, first derivative of current, and second derivative of current waveforms, respectively, generated by a series arc in an electrical system.

FIG. 1 illustrates waveforms associated with a series arc in an ac electrical system. The trace 1 in FIG. 1A illustrates the current. When the voltage in the ac system falls below the arcing voltage (typically about 20 to 30 volts in a 120 volt system) the current is interrupted as at 3 in FIG. 1A. The current remains at 0 until the voltage rises above the arcing voltage on the next half-cycle and the arc is restruck. Thus, at the point 5, following reestablishment of the arc, the current is reestablished.

Figure 1B:
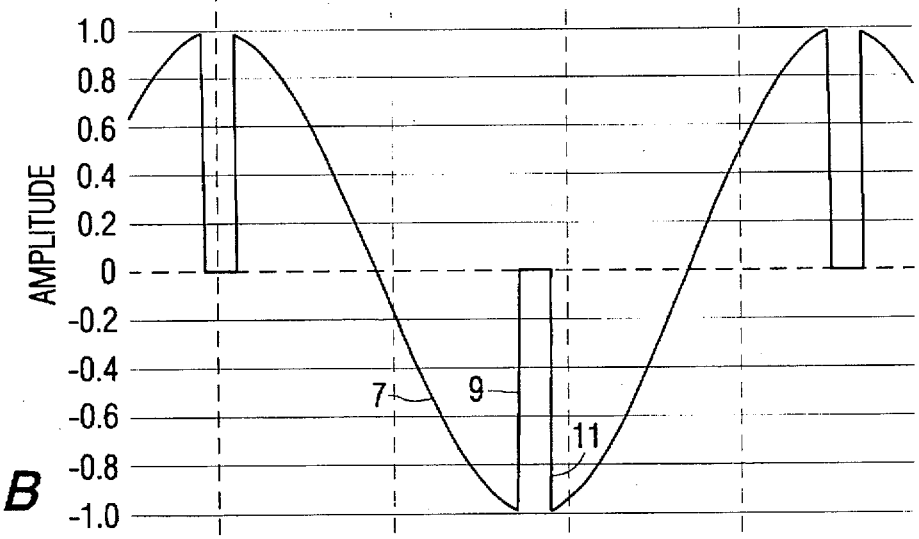
Figure 1C:
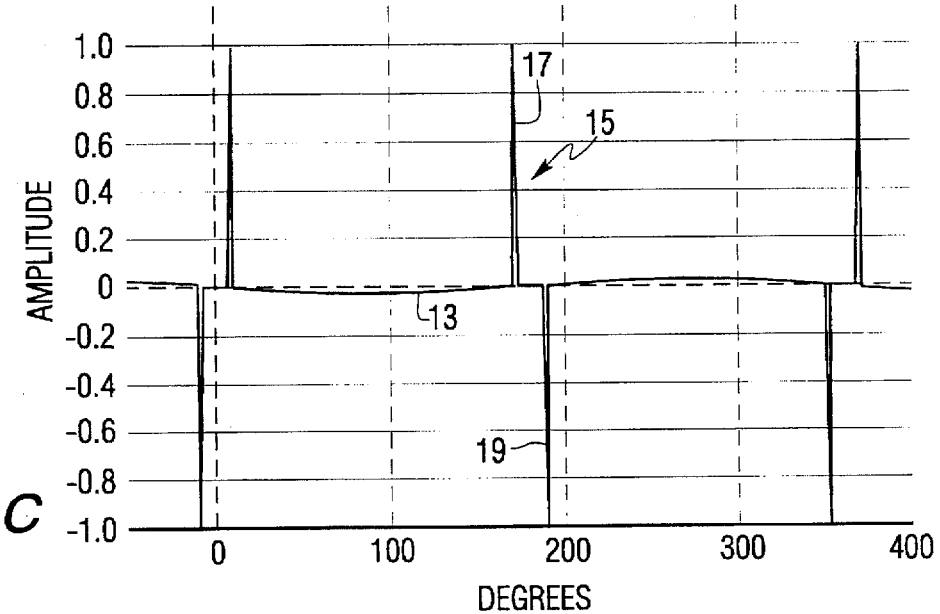

The first derivative of the arcing current 1 shown in FIG. 1A is illustrated in FIG. 1B as the trace 7. As can be seen, there are substantial steps 9 and 11 when the current is interrupted and when it is again reestablished. FIG. 1C illustrates the second derivative 13 of the arcing current. The second derivative signal 13 exhibits a pair 15 of pulses 17 and 19 resulting from the discontinuities in the current at the interruption of the arc and the reestablishment of the arc. It can be seen that these pulses 17 and 19 are of opposite polarity. As can also be seen, the polarity sequence is dependent upon the direction of the zero crossing. In other words, the polarity sequence is reversed on successive half cycles.

Figure 2A:
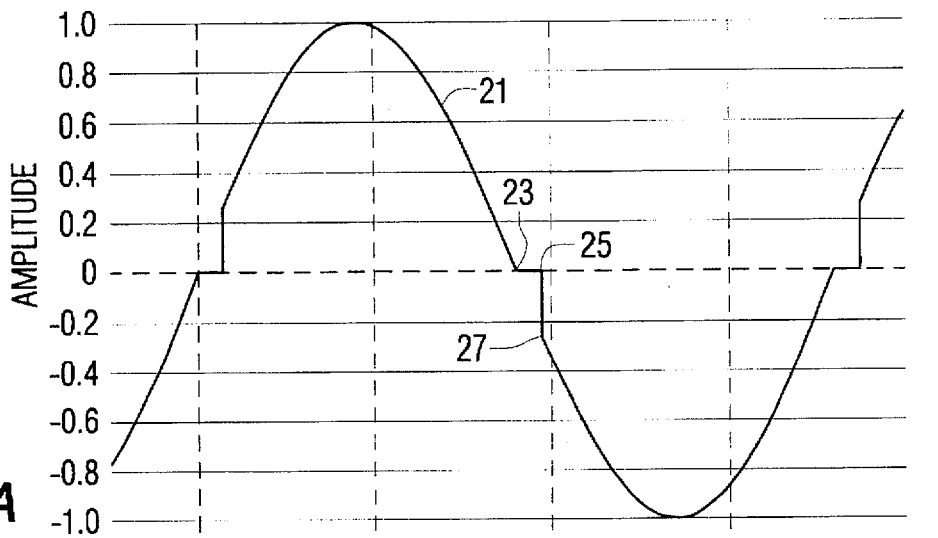
FIGS. 2A, B and C similarly illustrate the current, first derivative of current, and second derivative of current waveforms generated by a dimmer energized by an ac electrical system.
Figure 2B:
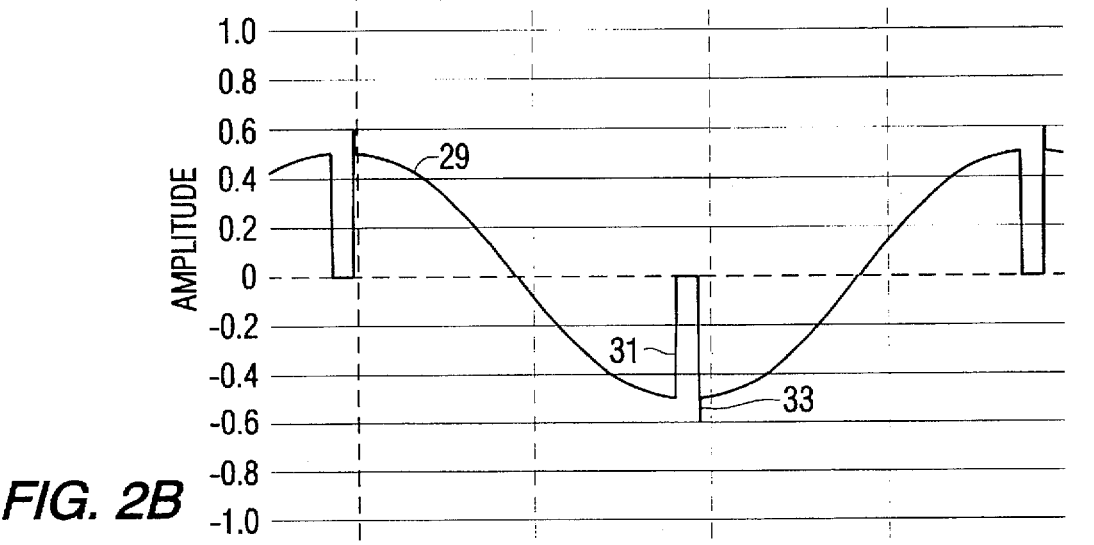
Figure 2C:
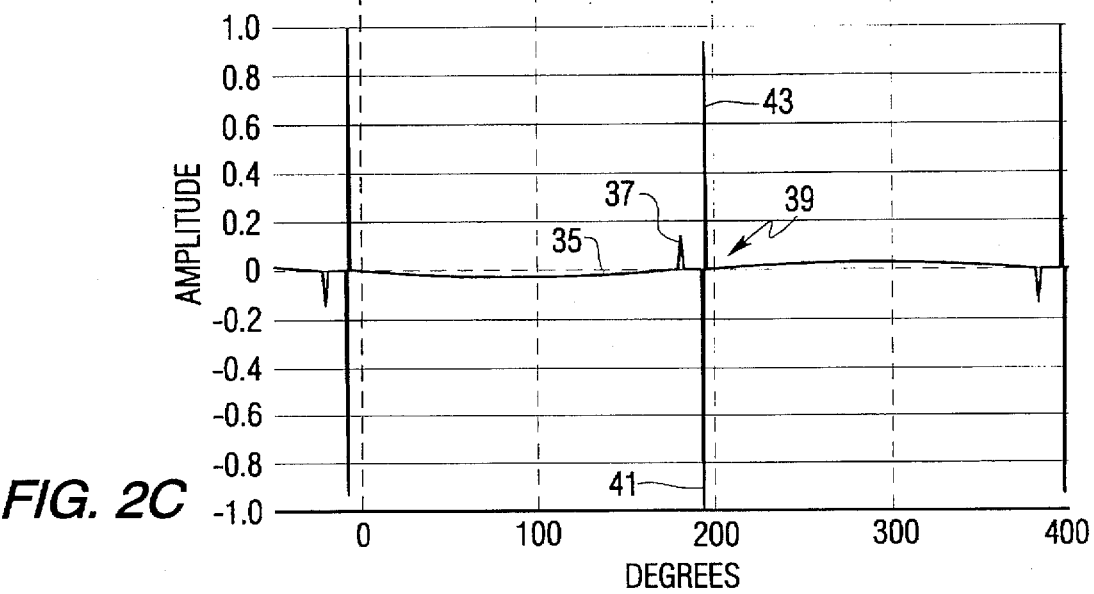

As mentioned above, a load that can generate waveforms having a similarity to those generated by a series arc is a dimmer. A dimmer delays turn-on of a switching device during each half-cycle of ac voltage in order to control power delivered to the load. Typically, the phase-back angle is selectable to provide a range of power settings. This delayed switching produces the waveforms illustrated in FIGS. 2A, B, and C. FIG. 2A illustrates the dimmer current waveform 21. As can be seen, the current is turned off at 23 at the end of a half-cycle and remains at zero until the dimmer switch again turns on at 25, causing the current to increase rapidly to the point 27 where it then becomes sinusoidal. FIG. 2B illustrates the first derivative 29 of the dimmer current. As can be seen, it has a discontinuity at 31 where its value goes to zero and a spike at 33. FIG. 2C illustrates the second derivative waveform 35 of the dimmer current. As can be seen, this second derivative of dimmer current has a small pulse 37 where the current falls to 0 and then remains at 0, and a pair of pulses 39 which includes a first pulse 41 when the current first reestablishes and increases rapidly, and a second pulse 43 where the current transitions to a sinusoidal waveform. As illustrated, the pulses 41 and 43 are of opposite polarity. It can also be seen that the pulses 37 and 41 are of opposite polarity.

The technique for series arc detection of the invention takes advantage of the fact that the second pulse 19 in the second derivative of the current resulting from a series arcing fault follows the first pulse 17 by a predictable interval of time and is of opposite polarity. Hence, such a pulse can be detected by looking for a second pulse in the second derivative current of the ac electrical system which occurs within a time window commencing a selected time after a first pulse and is of opposite polarity to the first pulse. Referring to FIG. 2C, it can be seen that the dimmer generates a pair of pulses 37 and 41 which are spaced in time and of opposite polarity. The pulses 41 and 43 also constitute a pair of pulses of opposite polarity but they are always in rapid succession. It is possible, however for the timing between the pulses 37 and 41 to fall within the window established for detecting the pulses 17 and 19. In order to discriminate the series arcing fault from a dimmer, the present invention looks for the third pulse 43 which rapidly follows the second pulse 41 in the second derivative of the dimmer current. It also ignores conditions in which the second pulse follows the first pulse too quickly.

Figure 3A:
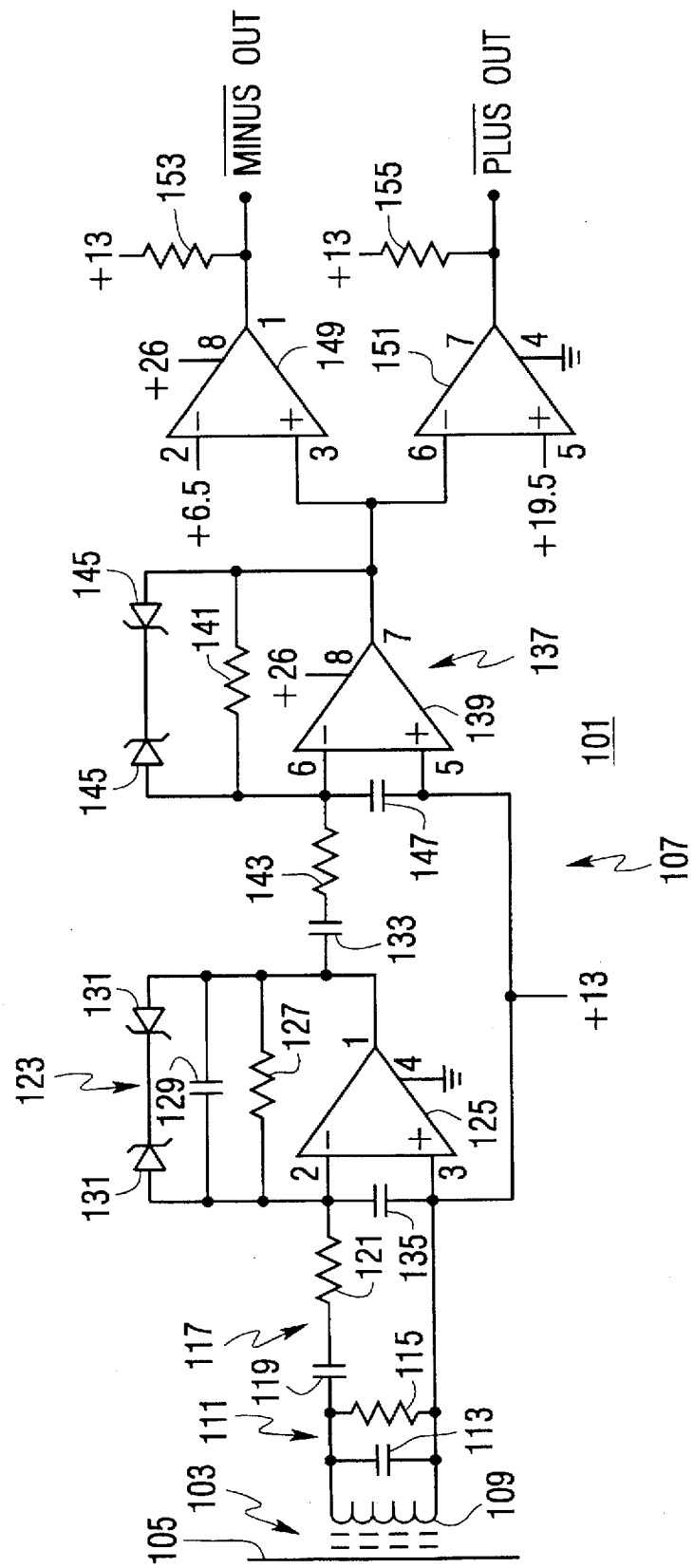
FIGS. 3A and B are a schematic circuit diagram of a series arc detector in accordance with the invention.

FIGS. 3A and B illustrate an exemplary embodiment of the arcing fault detector 101 in accordance with the invention for detecting series arcing faults in an ac electrical system 103 having one conductor 105 which may be the line or neutral conductor. A sensing circuit 107 senses the second derivative of current flowing in the conductor 105. This sensing circuit 107 includes a current transformer 109 which generates a first derivative of current signal, di/dt, through use of a core of material such as powdered iron which has a low mu and a high flux saturation level. This first derivative of current signal, di/dt is bandwidth limited by bandwidth limiter 111 comprising a shunt capacitor 113 and resistor 115. A differentiator 117 in the form of series capacitor 119 and resistor 121 generates a second derivative of current signal $di^2/dt$. Additional bandwidth limiting is provided by the circuit 123 which includes an op amp 125 with feedback resistor 127 and feedback capacitor 129. The zener diodes 131 prevent saturation of the op amp 125 by large pulses in the $di^2/dt$ signal. Further attenuation of 60 Hz noise is provided by the capacitor 133. RF noise suppression is provided by the capacitor 135 across the inputs to the op amp 125.

As the pulses on the $di^2/dt$ signal can have a wide dynamic range, an amplifier stage 137 comprising the op amp 139 with feedback resistor 141, and input resistor 143 is provided. Again, back-to-back zener diodes 145 prevent the op amp 139 from saturating on large pulses and the capacitor 147 provides RF noise suppression.

The sensing circuit 107 also includes differential comparators 149 and 151 which compare the output of the amplifier stage 137 to reference voltages of 6.5 volts and 19.5 volts respectively. As a plus 13 volt bias is applied to the op amps 125 and 139, the signal applied to the non-inverting input of the comparator 49 and to the inverting input of the comparator 51 are 13 volts when the $di^2/dt$ signal is zero. Under these conditions the outputs of the comparators 149 and 151 are high and the MINUSBAR OUT signal at the output of the comparator 149 is pulled up to 13 volts by the pull-up resistor 153. Similarly, the PLUSBAR OUT output signal of the comparator 151 is pulled up to 13 volts by the pull-up a resistor 155. A positive pulse in the $di^2/dt$ signal at the output of the op amp 139 which is above an absolute threshold of 6.5 volts causes the PLUSBAR OUT signal to go low. A negative pulse of more than 6.5 volts absolute similarly causes the MINUSBAR OUT signal to go low. Thus, the PLUSBAR OUT and MINUSBAR OUT signals are normally high, but go low momentarily in response to a positive and negative pulse, respectively, in the $di^2/dt$ signal.

Figure 3B:
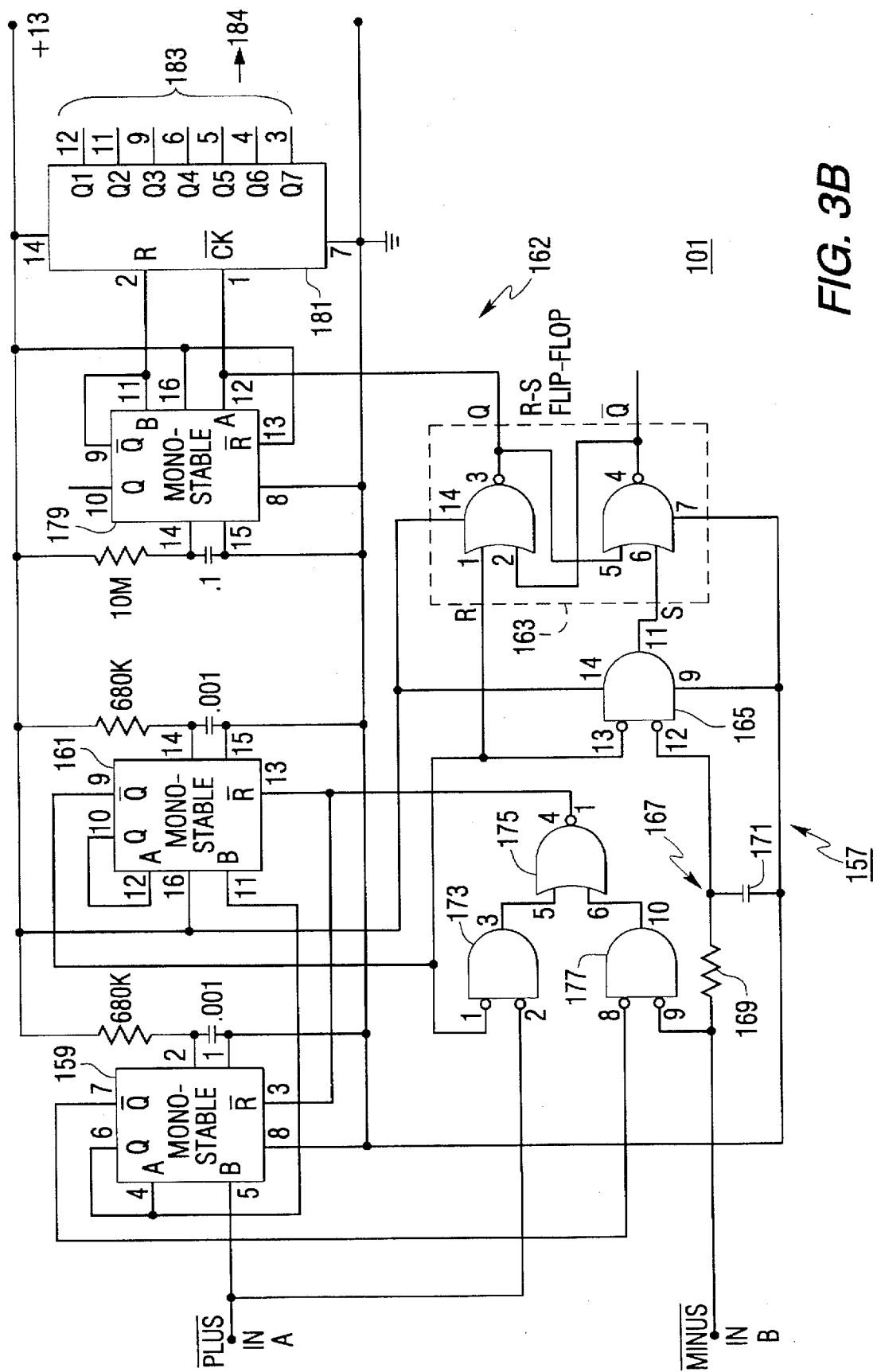
Figure 4:
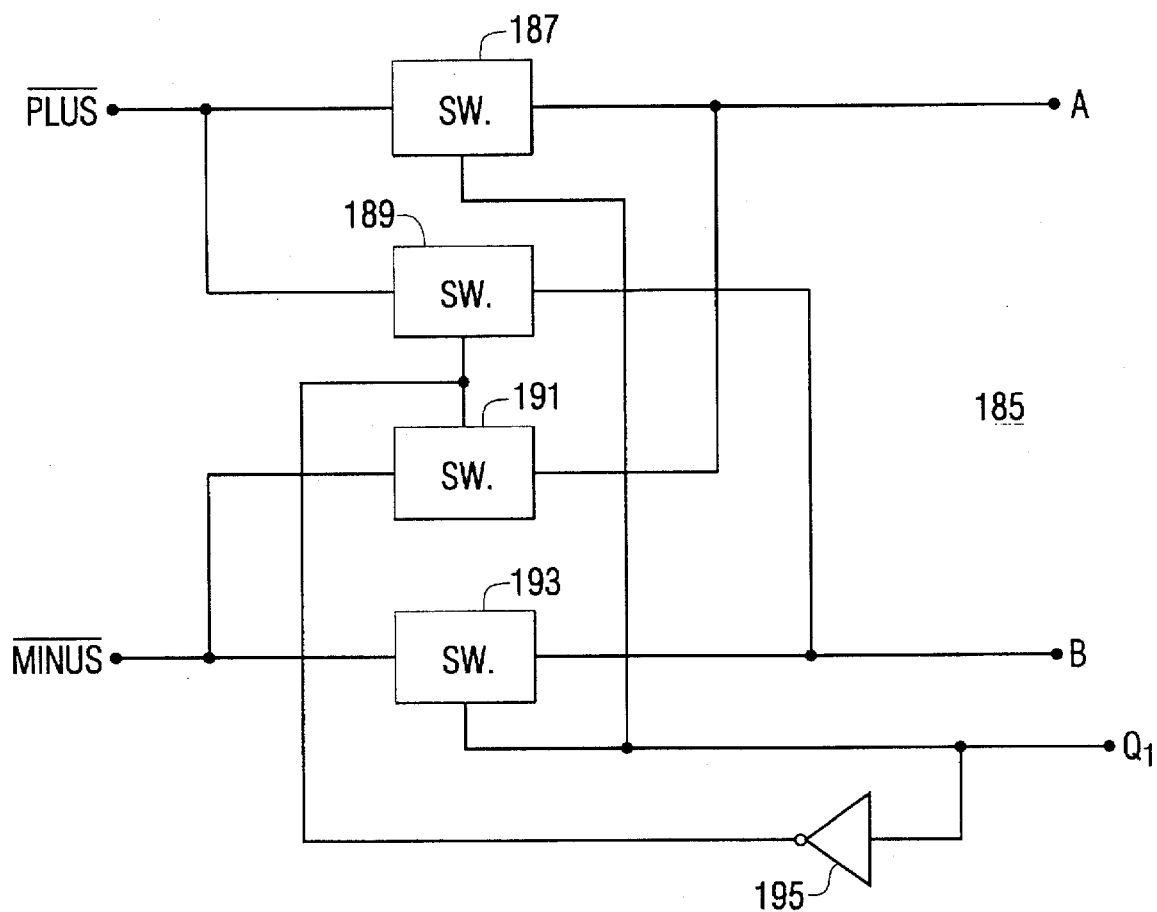
FIG. 4 is a schematic block diagram of a modification of a portion of the circuit of FIGS. 3A and B in accordance of another embodiment of the invention.

FIG. 3B illustrates a signal generating circuit 157 which generates an output signal indicative of an arc in response to a preselected polarity sequence and timing between pulses in the di²/dt. The PLUSBAR signal is applied to the B input of a first monostable 159. The negative or trailing edge of the PLUSBAR signal initiates timing by the monostable 159 of the first timing interval. This causes the Q output of the monostable 159 to go high. When monostable 159 times out, its Q output goes low triggering a second monostable 161 to begin timing the second timing interval. This is the timing interval in which a second pulse of opposite polarity will appear in the case of a series arcing fault.

An output signal generator 162 includes an R-S flip-flop 163 which has the QBAR output of the second monostable 161 connected to its reset input R. As the QBAR output of monostable 61 is normally high except during the second timing interval the Q output of the R-S flip-flop will normally be low. The S input of the R-S flip-flop 163 is connected to a negative logic NAND circuit 165 having as one input the QBAR output of the second monostable 161 and the MINUSBAR signal applied through a delay circuit 167 which includes a series resistor 169 and shunt capacitor 171. The negative logic NAND element 165 is only enabled by the QBAR output of the second monostable 161 during the second timing interval. A negative pulse in the di²/dt signal (MINUSBAR goes low) during this second timing interval will cause the S input to the R-S flip-flop 163 to go high setting the Q output of the flip-flop high. The delay 167 prevents the flip-flop 163 from being set until it is determined that a third pulse does not occur during the second interval. This condition is detected by circuitry which includes a having as one input the PLUSBAR signal and as the other input the QBAR output of the second monostable 161. Thus, during the second interval the output of negative logic NAND element 173 logic NAND at 173 will normally be zero. This output of the negative logic NAND 173 serves as an input to a NOR element 175 which has as a second input the output of a negative logic NAND circuit 77 which, as will be explained, is low during the second interval. Thus, normally during a second interval the output of a NOR 175 will be high which maintains the RBAR inputs to the first and second monostables 159 and 161 high. If the PLUSBAR signal goes low during the second interval, indicating a second pulse during the second interval or a third pulse since timing began, the output of the negative logic NAND 173 goes high which makes the output of NOR 175 to go low, thereby resetting both monostables 159 and 161. When the second monostable 161 is reset, its QBAR signal goes high to reset the R-S flip-flop 163 and disabling the negative logic NAND 165 to prevent the MINUSBAR signal from setting the R-S flip-flop after the time delay 167 is timed out.

The negative logic NAND 177 terminates timing if the second pulse, MINUSBAR, occurs too early, that is during the first interval. During this first interval, the negative logic NAND 177 is enabled by the QBAR signal from the first monostable 159. Normally, the MINUSBAR signal is high during the first interval thereby causing the output of negative logic NAND 177 to be low. However, if the MINUSBAR signal goes low, indicating a second pulse in the di²/dt signal, the output of the negative logic NAND 177 goes high thereby resetting the monostables 159 and 161 through the NOR 175.

When the Q output of the R-S flip-flop 163 goes high signifying detection of a positive pulse followed by a negative pulse within a time interval (the second time interval) commencing a predetermined time (the first time interval) after the first pulse, a third monostable 179 which forms part of the output signal generator 162 begins counting a time interval. This output of the R-S flop-flop 163 also clocks a digital timer 181. Each time the R-S flop-flop 163 generates a pulse during the time interval set by the monostable 179 the counter 181 is incremented. When the monostable 179 times out, its QBAR output goes high to reset the counter 181. A selected one of the outputs 183 of the counter 181 provides the output signal 184 indicative of an arcing fault. The selected output count indicates the number of events in which a positive pulse was followed by a negative pulse during a time interval set by the monostable 179.

The circuit of FIGS. 2A and 2B only counts events in which a positive pulse in the di²/dt signal is followed by a negative pulse within a given time interval. Thus, it only counts such events which occur during negative-to-positive zero crossings, or one time per cycle. By reversing the PLUSBAR and MINUSBAR inputs in FIG. 2B, events occurring on the opposite direction zero crossings could be detected. Again, this would only count one event per cycle of the ac cycle. In order to increase the reliability of the series arcing detector, the pulses of opposite polarity in the di²/dt signal during each half cycle can be detected. This could be accomplished by duplicating the circuit of FIG. 2B with the PLUSBAR and MINUSBAR inputs reversed with the outputs of the respective R-S flip-flops connected to a common timer 179 and digital counter 181. A simpler arrangement is to provide a reversing circuit 185 as shown in FIG. 3. This reversing circuit 185 includes four CMOS switches 187, 189, 191, and 193. The switch 187 connects the PLUSBAR signals to an output A while the switch 189 connects the same signal to the output B. Similarly, the switch 191 connects the MINUSBAR signal to the A output while the switch 193 connects it to the B output. The switches 187 and 193 are simultaneously closed by a high output on the $Q_1$ output of the counter 81 so when this count is high the PLUSBAR signal is connected to the A output and the MINUSBAR signal is connected to the B output. An inverter 195 turns on the switches 189 and 191 to reverse the PLUSBAR and MINUSBAR signals on alternate counts of the counter. As these outputs A and B are connected to the A and B inputs of signal generating circuit 157 in FIG. 3B, it can be appreciated that events occurring at both zero crossings of the ac current are detected. In this case, the count on the digital counter 181 during the interval determined by the monostable 179 would he doubled that described in the first instance where only events occurring at zero crossings in one direction were counted.

The series arcing detector of this invention can be used by itself to provide an indication of a series arc. It can also be incorporated into a circuit breaker to provide a trip signal in response to the series arc. Furthermore, it could be used in conjunction with a parallel arcing fault detector such as that disclosed in U.S. Pat. No. 5,224,006.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for detecting a series arcing fault in an ac circuit, said apparatus comprising:

sensing means sensing a second derivative of ac current in said ac circuit to generate a second derivative signal containing pulses in response to discontinuities in said ac current such as said series arcing fault; and signal generating means generating an output signal indicative of said series arcing fault in response to predetermined timing between said pulses in said second derivative signal.

2. The apparatus of claim 1 wherein said sensing means comprises means generating said second derivative signal containing pairs of pulses with a second pulse in said pair of pulses occurring during an interval of predetermined duration commencing a predetermined time after a first pulse in said pair in response to said series arcing fault, and wherein said signal generating means comprises means generating said output signal only when said second pulse occurs within said interval after said first pulse.

3. The apparatus of claim 2 wherein said signal generating means comprises means preventing generation of said output signal if an additional pulse occurs in said second derivative signal during said interval.

4. The apparatus of claim 3 wherein said signal generating means comprises means delaying generation of said output signal until means determine that no additional pulses have occurred during said interval.

5. The apparatus of claim 3 wherein said signal generating means comprises means preventing generation of said output signal if said second pulse in said second derivative signal occurs before said interval.

6. The apparatus of claim 2 wherein said signal generating means comprises means preventing generation of said output signal if said second pulse occurs before said interval.

7. The apparatus of claim 2 wherein said means generating said second derivative signal with pulses, generates first and second signals of opposite polarity in response to an arcing fault and wherein said signal generating means comprises means generating said output signal only when said second pulse occurs within said interval and is of opposite polarity to said first pulse.

8. The apparatus of claim 7 wherein said signal generating means generates said output signal only when said first pulse is of a predetermined first polarity and said second pulse is of opposite polarity.

9. The apparatus of claim 7 wherein said signal generating means includes means preventing generation of said output signal from generating said output signal when an additional pulse of either polarity occurs after said first pulse and before said interval.

10. The apparatus of claim 7 wherein said signal generating means comprises first means generating a first output signal when said first pulse is of a first polarity and said second pulse of a second polarity opposite said first polarity occurs within said interval, and second means generating a second output signal when said first pulse is of said second polarity and said second pulse of said first polarity occurs within said interval.

11. The apparatus of claim 7 wherein said means generating said output signal includes means generating a count of said first and second event signals and means generating said output signal only when said count reaches a predetermined number within a given time period.

12. The apparatus of claim 10 wherein said signal generating means includes means generating a final output signal only when a predetermined number of first or second output signals are generated within a given time period.

13. The apparatus of claim 7 wherein said signal generating means includes means counting times said output signal is generated and generating a final output signal only when said output signal is generated a predetermined number of times within a given time period.

14. The apparatus of claim 1 wherein said signal generating means includes means counting times said output signal is generated in generating a final output signal only when said output signal is generated a predetermined number of times within a given time period.

15. A method of detecting a series arcing fault in an ac circuit comprising the steps of:
generating a second derivative signal representative of a second derivative of current flowing in said ac circuit, which second derivative signal will have pulses in response to discontinuities in said current such as a series arcing fault;
measuring time between pulses in said second derivative signal; and
generating an output indicative of an arcing fault in response to predetermined timing between said pulses.

16. The method of claim 15 wherein said step of generating an output signal comprises generating said output signal only when a second pulse occurs during an interval of predetermined duration commencing within a predetermined time after a first pulse.

17. The method of claim 16 wherein said step of generating said output signal comprises generating said output signal only when said second pulse is of opposite polarity to said first pulse.

18. The method of claim 17 wherein said step of generating an output further comprises preventing generation of said output if an additional pulse occurs during said interval.

19. The method of claim 17 wherein said step of generating said output signal comprises preventing generation of said output signal if an additional pulse occurs after said first pulse but before said interval.

* * * * *